United States Patent [19]

Adams

[11] 4,105,428
[45] Aug. 8, 1978

[54] BLOW MOLDED GLASS ARTICLE MANUFACTURE

[75] Inventor: Terry L. Adams, Orange, Calif.

[73] Assignee: Anchor Hocking Corporation, Lancaster, Ohio

[21] Appl. No.: 764,384

[22] Filed: Jan. 31, 1977

[51] Int. Cl.² .................. C03B 9/14; C03B 23/18; C03B 9/00
[52] U.S. Cl. .................................... 65/77; 65/79; 65/82; 65/227; 65/229; 65/261; 65/264; 65/305
[58] Field of Search ............ 65/362, 229, 224, 77, 65/261, 262, 227, 79, 82, 264, 305

[56] References Cited

U.S. PATENT DOCUMENTS

| 1,223,392 | 4/1917 | Kadow ...................... 65/261 |
| 2,024,748 | 12/1935 | Schaffer et al. ............ 65/362 X |
| 2,669,806 | 2/1954 | Van de Walle et al. ........ 65/224 |
| 3,468,648 | 9/1969 | Nowak ..................... 65/362 X |
| 3,490,891 | 1/1970 | Fouse ...................... 65/229 X |
| 3,792,988 | 2/1974 | Nowak et al. .............. 65/229 X |
| 3,834,884 | 9/1974 | Kurukawa et al. ........... 65/261 X |

*Primary Examiner*—S. Leon Bashore
*Assistant Examiner*—Frank W. Miga
*Attorney, Agent, or Firm*—Connolly and Hutz

[57] ABSTRACT

A decorative pattern is formed on the inner surface of the blow molded glass article by imprinting the pattern on the surface of the glass gob by means of a die having the pattern formed thereon and subsequently blow molding against the imprinted surface.

5 Claims, 11 Drawing Figures

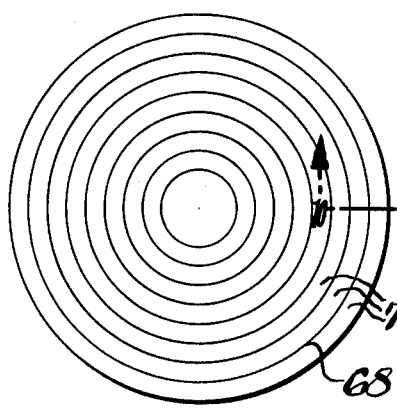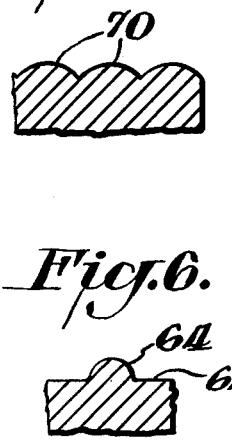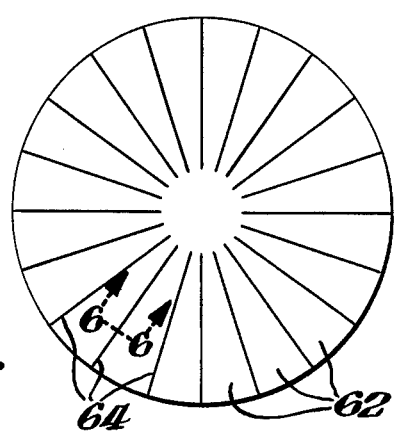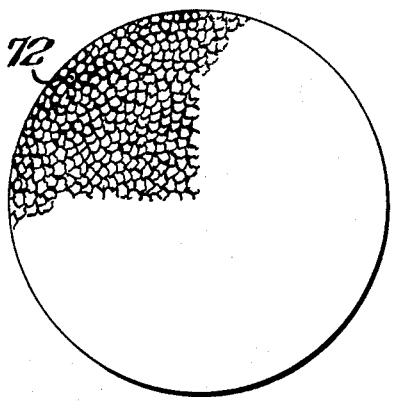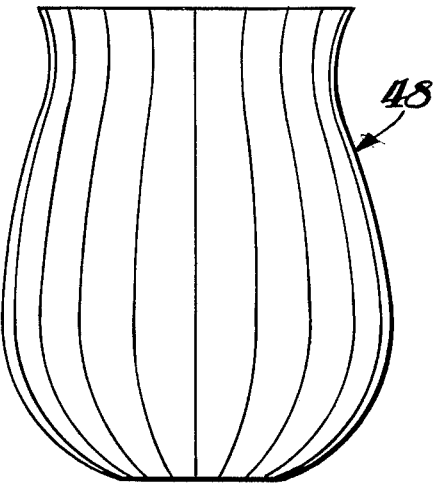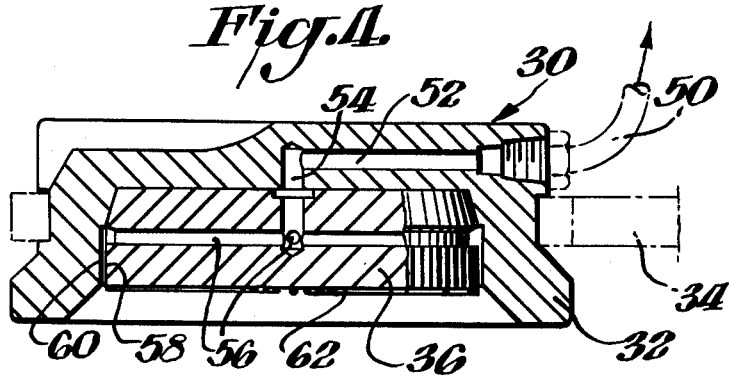

BLOW MOLDED GLASS ARTICLE MANUFACTURE

BACKGROUND OF THE INVENTION

In the fabrication of glass articles one of the common well-known methods is to create a preform or parison by various means and then form the glass into final design by blowing into a blow mold. It is frequently desirable to create patterns into the glass surface in either the inside or outside surface thereof. This invention is directed to techniques for creating such patterns on the inside surface.

SUMMARY OF THE INVENTION

An object of this invention is to provide an assembly for forming a decorative pattern on the inner surface of a blow molded glass article.

A further object of this invention is to provide such an assembly wherein the type of pattern formed can be quickly and conveniently changed for successive articles by simple manipulations thereof.

A still further object of this invention is to provide a process for forming such a decorative pattern wherein existing machinery can be used with certain modifications thereto.

A still further object of this invention is to provide such a process which lends itself to forming artistic or geometric designs on the inner surface in a quick and convenient manner.

In accordance with this invention a decorative pattern is formed on the inner surface of the blow molded glass article by imprinting the pattern on the surface of the glass gob by means of a die having the pattern formed thereon and subsequently blow molding against the imprinted surface. The die is preferably in the form of a vacuum head having a removable insert with the pattern being formed on the exposed surface of the insert whereupon a new pattern may be created for successive articles by simply changing the insert.

The blowing operation is preferably accomplished by first blowing gently in open air before the mould closes around the parison and, after the mould subsequently closes, the blowing operation is continued until completion.

THE DRAWINGS

FIG. 4 is a cross-sectional view in elevation illustrating the die assembly of FIGS. 1-2;

FIG. 5 is a bottom plan view of the die insert shown in FIG. 4;

FIG. 6 is a cross-sectional view taken through FIG. 5 along the line 6—6;

FIG. 7 is an elevation view partly in section of a parison formed by the die assembly of FIGS. 4-6;

FIG. 8 is a side elevation view of a finished glass article formed from the parison of FIG. 7;

FIG. 9 is a bottom plan view of another form of die insert in accordance with this invention;

FIG. 10 is a cross-sectional view taken through FIG. 9 along the line 10—10; and FIG. 11 is a bottom plan view of yet another die insert in accordance with this invention.

DETAILED DESCRIPTION

Figure 1:
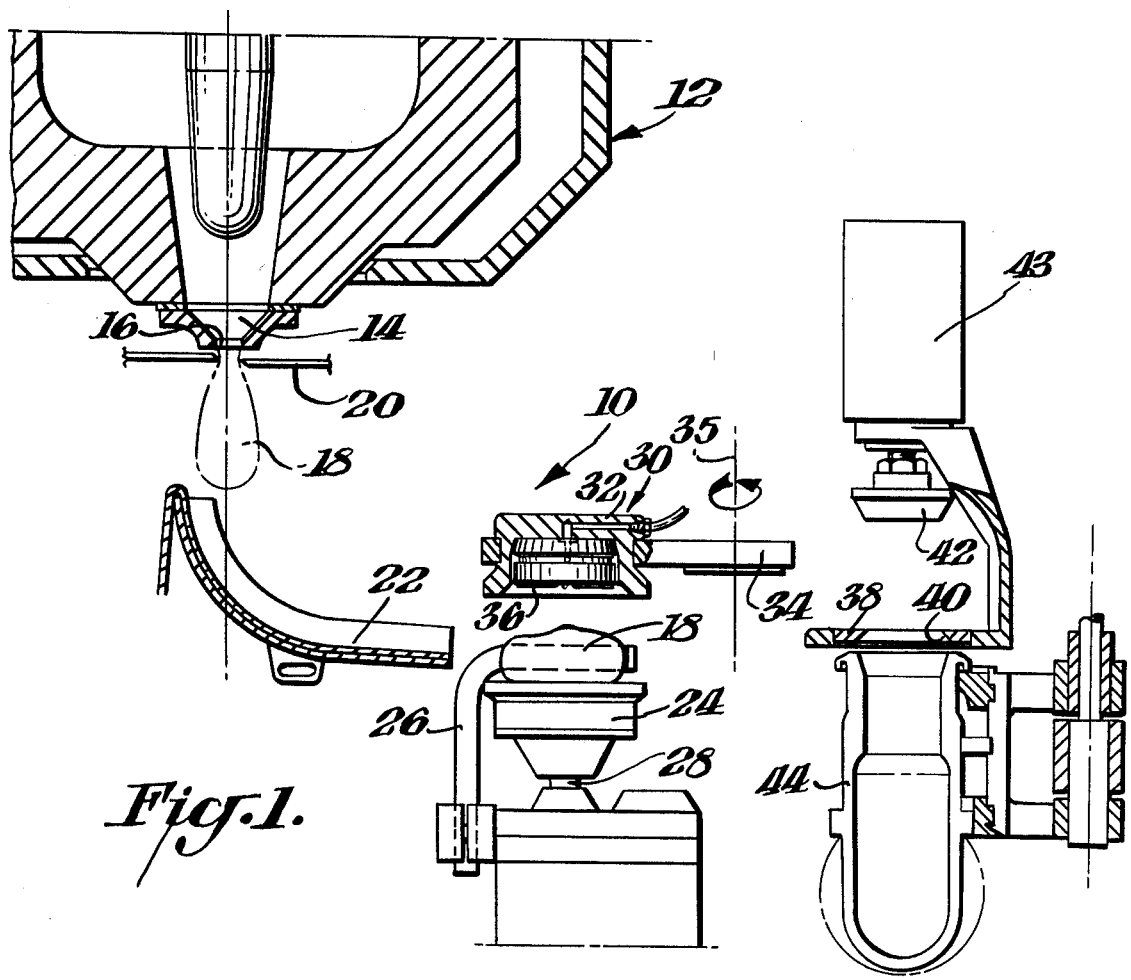
FIG. 1 is an elevation view partly in section schematically showing an assembly in accordance with this invention.
Figure 2:
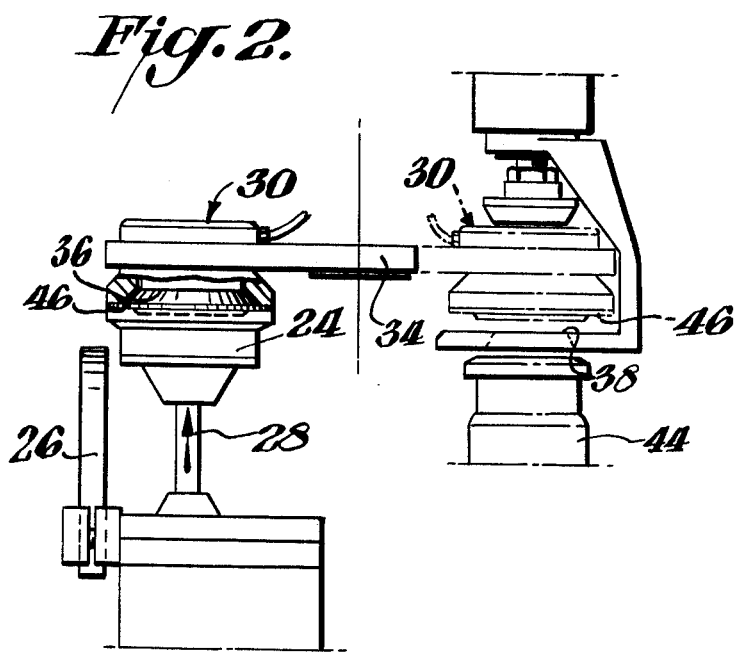
FIGS. 2-3 are cross-sectional views partly in section showing portions of the assembly of FIG. 1 in different phases of operation.

FIG. 1 illustrates an assembly 10 utilized in the practice of this invention. As indicated therein, a conventional feeder 12 is provided for supplying a stream of molten glass 14 through orifice 16. A gob 18 of such glass material is cut off by shears 20 when the gob is of proper shape and weight, as known in the art. Gob 18 drops in free fall into trough 22 and slides onto anvil or press plate 24. A gob positioner 26 is provided having a ground and polished gob contacting surface with side wall restraints for being disposed or wrapping around the gob 18 to position the gob 18 at the proper location on anvil 24. Positioner 26 may, for example, be formed in two mating parts which close around gob 18. Positioner 26 is then moved away from anvil 24 by, for example, separating the parts and moving them off anvil 24, as shown in FIG. 2. The anvil 24 is mounted on a reciprocating support 28 for up and down movement and is then moved upwardly, as shown in FIG. 2, toward die assembly 30 to press gob 18 into the die assembly thereby forming a parison or preform with anvil 24 forming the configuration of the lower surface of the parison.

Die assembly 30 comprises a vacuum head 32 mounted on rotatable arm 34 with a removable insert 36 therein. Insert 36, as later described, has a decorative pattern formed thereon to thereby imprint the upper surface of the parison with a corresponding pattern. When gob 18 has been pressed into vacuum head 32 and insert 36 the vacuum is actuated, as later described, to hold the thusly formed parison therein. Anvil 24 then drops away by retraction of support 28, as shown in FIG. 1.

After anvil 24 is retracted vacuum head support arm 34 is rotated to dispose the vacuum head and the parison held thereby at the blow molding station. The vacuum is turned off so that the parison is deposited onto work table or aperture plate 38 over its central aperture 40. Vacuum head 32 is then rotated back to the preform station after parison 46 has dropped a sufficient distance to provide clearance for such rotation.

Figure 3:
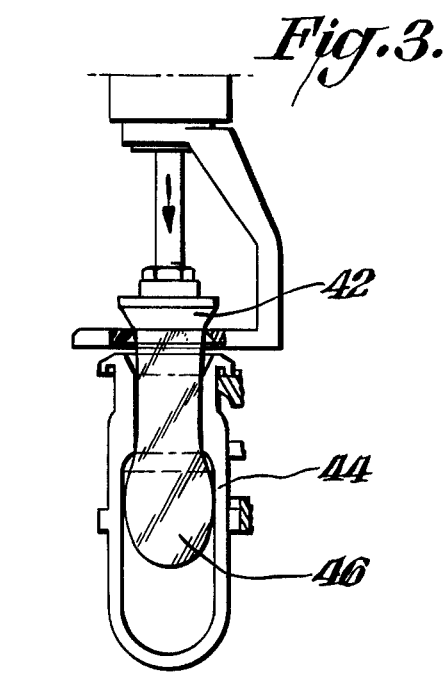

Blow head 42 is moved downwardly (FIG. 3) by motor 43 to further pre-form the glass charge or parison 46. At this point the mould 44 is still open so that the initial blowing against the parison is accomplished by gently blowing air from blow head 42 as actuated by motor 43. After a suitable period of time mould 44 is closed around blown parison 46 and the blowing operation is continued. Thus the imprint of the design on the cooling gob of glass become the interior surface 48 (FIG. 8) after the mold has been opened and the article discharged from the machine.

The general type of assembly hereinbefore described may be suitably provided and the invention thereby practiced by adaptation and use of known machinery, such as the Olivotto M-12 machine. In such machine, for example, the preform station and blow molding station would be incorporated in the common machine so that a simple rotation of arm 34 would conveniently transport the parison from one station to the other.

FIG. 4 shows in greater detail the die assembly 30 which includes vacuum head 32 and insert 36 as well as rotatable arm 34. As indicated therein, a suction hose 50 communicates with passage 52 in the interior of vacuum head 32. Vacuum head 32 is generally cup shaped and insert 36 is fit into the recessed inner surface of vacuum head 32 and secured thereto by suitable fasteners (not shown) extending, for example, through the upper surface of vacuum head 32 and into the upper surface of insert 36. Insert 36 includes a vertical passage 54 which communicates with passage 52 of vacuum head 32. Passage 54 in turn communicates with any suitable number of radial passageways 56 leading to the outer surface of insert 36. Clearance is provided between opposing outer wall 58 of insert 36 and inner wall 60 of vacuum head 32. In this manner when suction is applied through tube 50 the vacuum or suction action likewise occurs around the periphery of insert 36 in the open end of vacuum head 32. The suction would be sufficient to hold a parison or glass gob therein after the anvil has been withdrawn therefrom and while arm 34 is rotated about its axis 35 to the blow molding station. Discontinuing the vacuum would then permit the parison to be deposited upon aperture plate or work table 38.

The decorative pattern is formed in the upper surface of the parison 46 by forming a corresponding pattern on the lower surface of insert 36. Such pattern may be formed on insert 36 by cutting various artistic or geometric designs onto the gob contacting surface 62 of insert 36. FIGS. 5–6, for example, illustrate one form of decorative pattern wherein radial embossments 64 are formed on surface 62 to form corresponding depressions on the upper surface 66 on parison 46 (FIG. 5). When the parison 46 is blow molded into the finished article a corresponding decorative pattern results from the imprinted arrangement by embossments 64.

An advantageous feature of this invention is that the simple detachment of insert 36 from vacuum head 32 and replacement with a different type of insert would result in any number of artistic patterns or geometric designs for succeeding articles. FIGS. 9–10, for example, illustrate an arrangement wherein the lower surface 68 of an alternative die insert is formed with a series of embossments 70 forming concentric circles which would result in a correspondingly different form of finished article. Similarly, FIG. 11 illustrates, in part, a hammered design or affect 72 formed on the lower surface of a yet further insert. Other inserts might include spiral formations, hobnail designs, checkered patterns or any other random or symmetric pattern as desired.

What is claimed is:

1. A process for forming diverse decorative patterns on the inner surface of diverse blow molded glass articles with the utilization of the same basic equipment comprising forming a discrete gob of molten glass, transporting the gob to an anvil, removably attaching a pattern forming insert on a die, disposing the die in line with the anvil with the removably attached pattern thereon corresponding to the decorative pattern, moving the anvil and die relatively toward each other until the die contacts the gob and the pattern on the die imprints a corresponding pattern on one generally flat horizontal surface of the gob to form a parison therefrom, forming the parison in a generally flat form, transporting the parison to a blow molding station, blowing against the generally flat horizontal imprinted surface of the parison to form a glass article of non-uniform thickness with the imprinted surface comprising the inner surface of the article, detaching the pattern forming insert when a different decorative pattern is to be formed, removably attaching to the die a different pattern forming insert corresponding to the different pattern, and repeating the gob forming and transporting steps and the anvil and die contacting and parison transporting and blowing steps.

2. The process of claim 1 including gently blowing against the imprinted surface of the parison in open air at the beginning of the blowing step, and then closing a mould around the blown parison as the blowing step continues until the blowing step is complete.

3. The process of claim 1 wherein the die comprises an insert in a vacuum head with the pattern formed on the insert, and removably securing the insert to the vacuum head whereby the pattern may be changed by replacing the insert.

4. The process of claim 3 including gently blowing against the imprinted surface of the parison in open air at the beginning of the blowing step, and then closing a mould around the blown parison as the blowing step continues until the blowing step is complete.

5. The process of claim 4 wherein the gob is formed by cutting a drop of molten glass from a feeder, the transporting step comprising dropping the gob in free fall into a trough and sliding the gob down the trough on to the anvil, positioning the gob on the anvil with a positioning which contacts the gob by a ground and polished surface with sidewall restraints, removing the positioner after the gob has been properly positioned on the anvil, moving the anvil upwardly toward the die to effect the relative motion therewith, turning on the vacuum to hold the imprinted parison in the vacuum head, withdrawing the anvil away from the parison, rotating the vacuum head toward a work table at the blow molding station, depositing the imprinted parison on the table above an orifice therein, and moving a blow head toward the imprinted parison to begin the blowing operation.

* * * * *